United States Patent [19]

Nap

[11] Patent Number: 4,988,975
[45] Date of Patent: Jan. 29, 1991

[54] DIP STICK RESISTIVE LIQUID LEVEL DETECTOR WITH ADJUSTABLE STOP

[76] Inventor: Kimbel A. Nap, 6220 N. Sunnypoint Rd., Glendale, Wis. 53217

[21] Appl. No.: 133,148

[22] Filed: Dec. 14, 1987

[51] Int. Cl.$^5$ .............................................. G08B 21/00
[52] U.S. Cl. ................................ 340/450.3; 324/696; 73/304 R; 340/620; 340/622
[58] Field of Search ................... 340/59, 620, 622–625, 340/450, 450.1, 450.2, 450.3; 73/293, 295, 290 R, 304 R, 304 C; 324/65 P, 691, 693, 696; 116/109, 227; 374/116, 146, 148, 208, 209

[56] References Cited

U.S. PATENT DOCUMENTS

| | | | |
|---|---|---|---|
| 2,780,692 | 2/1957 | Hinojosa | 340/59 |
| 3,132,331 | 5/1964 | Boddy | 340/59 |
| 3,272,174 | 9/1966 | Pribonic | 340/450.2 |
| 3,548,657 | 12/1970 | Panerai et al. | 73/293 |
| 3,713,338 | 1/1973 | Kind | 73/293 |
| 4,038,650 | 7/1977 | Evans et al. | 73/293 |
| 4,069,838 | 1/1978 | Hansel et al. | 137/392 |
| 4,186,604 | 2/1980 | Mattila | 73/295 |
| 4,193,004 | 3/1980 | Lobdell et al. | 250/577 |
| 4,256,403 | 3/1981 | Powell | 73/293 |
| 4,287,427 | 9/1981 | Scifres | 250/577 |
| 4,322,713 | 3/1982 | Duck et al. | 340/59 |
| 4,322,713 | 3/1982 | Duck et al. | 340/620 |
| 4,423,751 | 1/1984 | Roettgen | 340/626 |
| 4,476,714 | 10/1984 | Barry et al. | 340/450.3 |
| 4,506,258 | 3/1985 | Charboneau | 40/59 |
| 4,654,646 | 3/1987 | Charboneau | 340/59 |
| 4,751,845 | 6/1988 | Peterson | 340/59 |

FOREIGN PATENT DOCUMENTS

| | | | |
|---|---|---|---|
| 513358 | 2/1955 | Italy | 340/59 |
| 2116323 | 9/1983 | United Kingdom | 340/59 |

OTHER PUBLICATIONS

The National Semiconductor Corporation, LM 1042 Fluid Level Detector, pp. 1 through 7, Aug., 1986, U.S.A.

Primary Examiner—Herbert Goldstein
Assistant Examiner—Jill Jackson
Attorney, Agent, or Firm—Fuller, Ryan Hohenfeldt

[57] ABSTRACT

A fluid level detector comprises a thermoresistive probe and a controlling circuit. The probe replaces the conventional dip stick on internal combustion engines and other machinery having an oil sump and a dip stick tube. The probe comprises an elongated wand of insulative material to which is threaded a length of thermoresistive wire, the resistance of which varies with the amount of immersion thereof into the oil. The circuitry operates various light emitting diodes for alerting operating personnel of the oil level. The probe wire is connected to the circuitry via conductive strips bonded to the wand and conductive elements in contact with the strips and leading to the circuit. An insulative sheath surrounds the wand and strips. A rubber grommet attached to the upper end of the probe seals the machine dip stick tube.

8 Claims, 2 Drawing Sheets

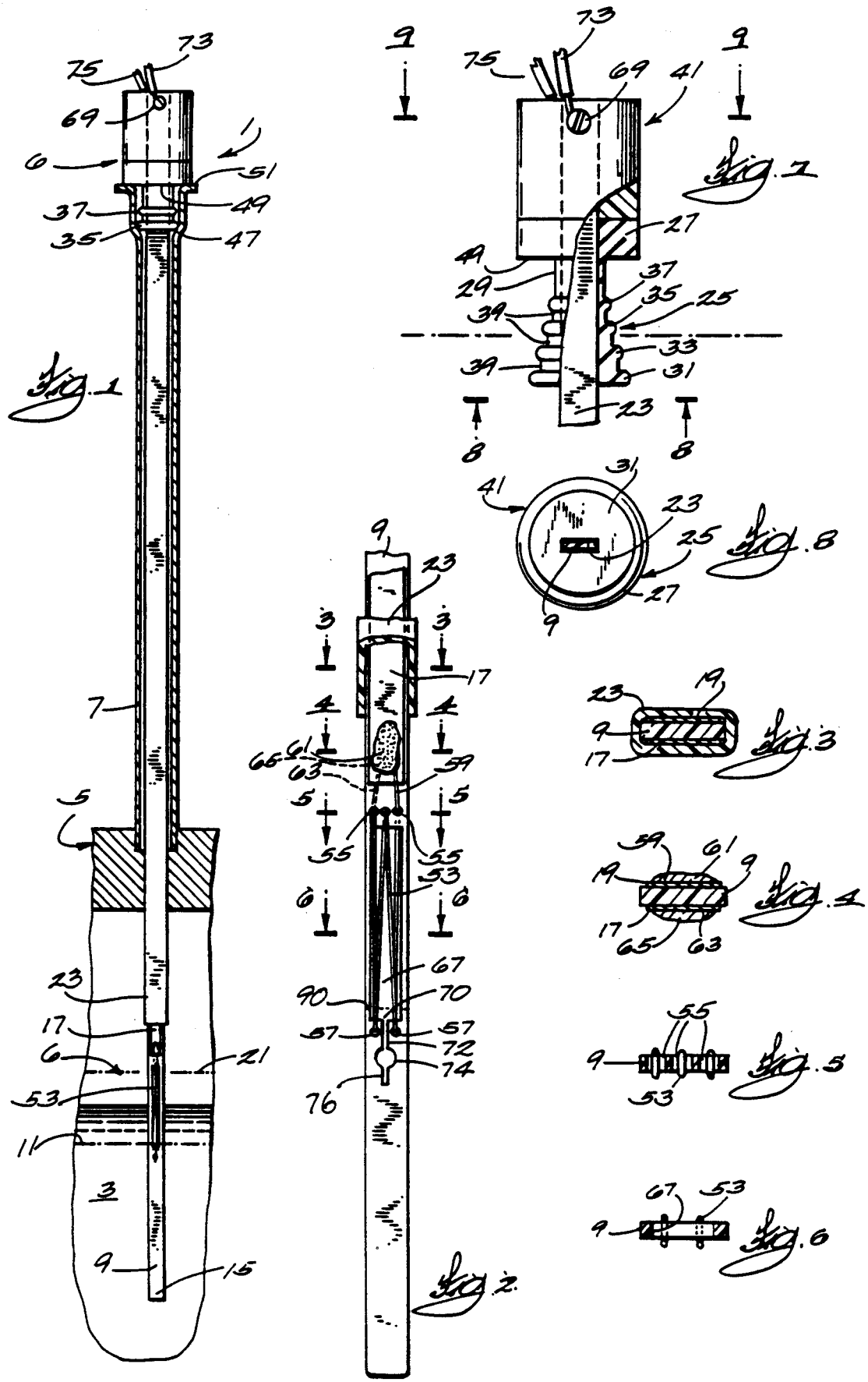

DIP STICK RESISTIVE LIQUID LEVEL DETECTOR WITH ADJUSTABLE STOP

BACKGROUND OF THE INVENTION

1. Field of the Invention.

This invention pertains to measuring devices, and more particularly to apparatus for determining the quantity of fluid in a reservoir.

2. Description of the Prior Art.

Various products have been developed to indicate the level of fluid within a closed container. For example, sight glasses and float operated needles in combination with calibrated dials are in widespread use. Light beams in conjunction with light sensors are known, such as are illustrated in U.S. Pat. Nos. 3,548,657 and 4,193,004. U.S. Pat. Nos. 3,272,174; 3,713,338; 4,038,650; and 4,069,838 4,287,427; describe different level sensors that employ fiber optics. The aforementioned devices are not generally suitable for measuring the quantity of lubricating oil in internal combustion engines.

U.S Pat. No. 4,322,713 discloses an electronic dip stick that senses a predetermined low fluid level in automotive engines. However, the electronic dip stick of the 4,322,713 patent does not indicate low oil levels approaching the minimum level, and consequently it does not alert a user that the undesirable low level condition is being approached. Renault has introduced an oil level sensor in some of its engines and uses a chip LM1042 specifically designed for this sensor. The Renault Part Number is 327-041-01. This sensor does not employ the dip stick tube for access to the engine. It is threadably and permanently mounted in the engine block.

A need exists for instrumentation which can be used in a wide variety of engines and fluid sensing environments.

SUMMARY

In accordance with the present invention, a fluid level detector is provided which can be retrofitted in the dip stick tube of most automobile engines. This adaptability is afforded by an adjustable length and flexible wand which supports a resistance wire and electrical leads. An adjustable stop enables adjustment of the length of the wand immersion to calibrate the wand with the existing level dip stick. The detector senses and displays the quantity of fluid in a reservoir over the full range of quantities between normal, maximum and minimum amounts. This is accomplished by apparatus that includes a variable resistance electrical wire that is partially immersed in the fluid and which is controlled by suitable electronic circuitry. The commercially available chip LM1042 can be employed.

When a constant electric current is applied to the detector wire, its resistance varies directly with its temperature. In turn, the temperature of the wire is governed by the amount of its length that is not immersed in the fluid. That is because the fluid conducts heat away from the wire, so that the wire remains cooler and the electric resistance decreases as the wire is immersed further into the fluid. Accordingly, a constant current applied to the wire results in a voltage that is inversely proportional to the immersion depth of the wire.

In the disclosed construction the detector is formed from a pair of elongated metallic strips and electrical conductors that are supported on and are separated by the insulative blade. The lower ends of these strips are connected at one end to the detector wire. The upper ends of the strips are connected to the circuit leads for connection to the electronic circuit. The length of the wand is adjusted during calibration by cutting off the upper end of the detector The electrical connections are readily made by screws supported in a terminal block which slides over the conductor strip assembly. The screws can be engaged with strips at any point along the upper end of the detector The electrical leads are connected to the screws. The wire, strips, and blade are encased within an insulative sheath or coating sized to form a probe that fits within the dip stick tube leading to the engine oil reservoir.

To seal the opening of the reservoir tube, the probe of the present invention includes a grommet of resilient and insulative material that is molded over the sheath near the other end of the blade. The grommet is designed with several radially extending and axially spaced flanges of unequal diameter. The grommet is cut transversely such that the end flange remaining on the grommet fits within and seals against a shoulder of the reservoir tube opening. Additional sealing of the reservoir tube is accomplished by a large diameter flange of the grommet contacting the tube end base.

The insulative sheath end adjacent the grommet is encapsulated by a glass-filled nylon adjustable stop. Two screws extending through the handle contact the respective metal strips. Wires are looped under the screw heads for connecting the wires to the electronic circuitry.

The electronic circuitry is generally of conventional construction, and it includes a pair of conventional integrated circuits. Light emitting diodes included in the circuitry alert a person to the condition of the oil supply over the entire range between a full and a dangerously low condition. The detector senses and displays the quantity of fluid in a reservoir over the full range of quantities between normal, maximum and minimum amounts. This is accomplished by apparatus that includes a variable resistance electrical wire that is partially immersed in the fluid and which is controlled by suitable electronic circuitry. The commercially available chip LM1042 can be employed.

Other objects, aims, and advantages of the invention will become apparent to those skilled in the art upon reading the disclosure.

BRIEF DESCRIPTION OF THE DRAWINGS

FIG. 1 is a longitudinal cross-sectional view of the probe of the fluid level detector of the present invention.

FIG. 2 is an enlarged cross-sectional view of the lower end of the probe shown in FIG. 1.

FIG. 3 is a cross-sectional view taken along lines 3—3 of FIG. 2.

FIG. 4 is a cross-sectional view taken along lines 4—4 of FIG. 2.

FIG. 5 is a cross-sectional view taken along lines 5—5 of FIG. 2.

FIG. 6 is a cross-sectional view taken along lines 6—6 of FIG. 2.

FIG. 7 is a partially broken enlarged view of the probe.

FIG. 8 is a view taken along lines 8—8 of FIG. 7.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1–10, a fluid level detector 1 is illustrated that includes the present invention. The fluid level detector is particularly useful in measuring the quantity of oil 3 in the crankcase of an internal combustion engine 5. However, it will be understood that the invention is not limited to use with power plant applications.

Figure 9:
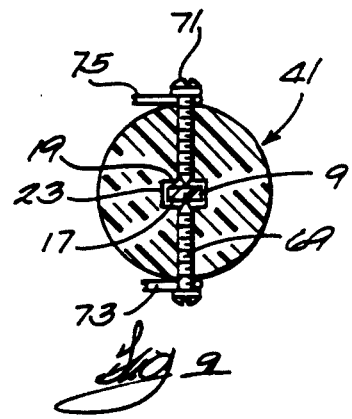
FIG. 9 is a view taken along lines 9—9 of FIG. 7.
Figure 10:
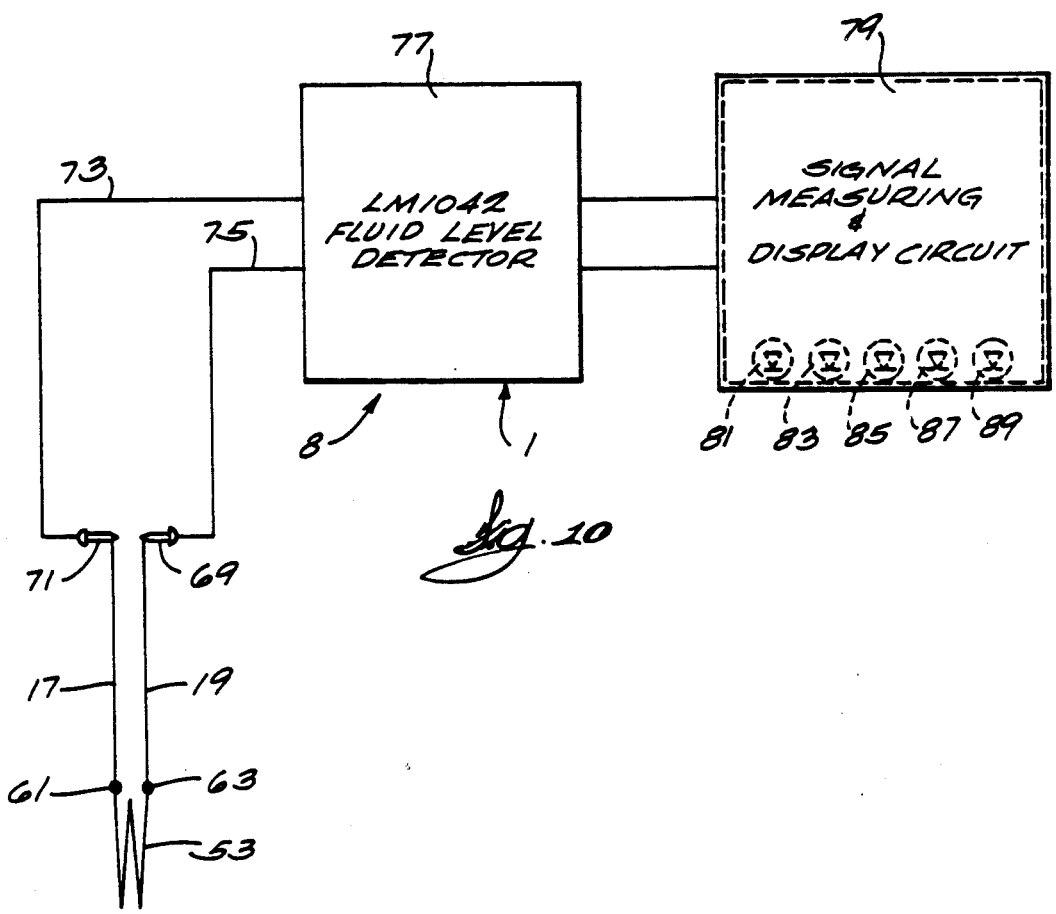
FIG. 10 is a schematic diagram showing the electronic circuitry of the present invention.

The fluid level detector 1 is comprised of a thermosensitive probe 6 illustrated in FIGS. 1–9 and an electronic circuit 8, schematically illustrated in FIG. 10. It is a feature of the present invention that the probe 6 is designed to replace the conventional dip stick, not shown, normally supplied with the engine 5 without having to alter the engine in any way. Accordingly, the probe is manufactured with elongated parts dimensioned to fit within the engine dip stick tube 7 in any automobile engine and to extend from the crankcase oil level to the top of the tube. Thus, the probe is insertable into and removable from the dip stick tube 7 in the customary manner.

The probe 6 is comprised of an elongated band 9 of electrically non-conductive material. A preferred material is a glass reinforced nylon, similar to the material used as the substrate in conventional electronic circuit boards. The band 9 preferably has a rectangular cross-section. The band length is sufficient to extend from below the minimum level 9 of the oil 3 to above the top end of the dip stick tube 7. The band bottom end 15 can be cut off to suit the depth of the crankcase.

Bonded to the opposite sides of the band 9 are a pair of electrically conductive strips 17 and 19, which may be made of copper. Copper strip material of approximately 0.0014 thickness used in printed circuit boards can be employed. G10 copper clad 1 oz. printed circuit board material has been successfully tested. Thinner or thicker board material can be used. The strips can be sheared or otherwise severed from the bulk material. The copper strips 17 and 19 extend from the band upper end 15 to a location slightly above the highest oil level 21. The band and copper strips are encased within a non-conductive sheath 23 desirably made of heat shrink material, such as a TEFLON tubing or a conformal coating such as an abrasion resistant non-conductive paint. Alternatively, a solder mask such as HYSOL can be employed. The sheath 23 may be of slightly shorter length than the copper strips, with the sheath lower end terminating a short distance above the lower end of the strips.

Molded over the sheath 23 near the upper end thereof is a grommet 25. The grommet 25 is composed of a thick flange portion 27, to which is connected a neck 29 of relatively small diameter. Integrally joined to the grommet neck 29 are a series of axially spaced flanges 31, 33, 35, and 37. The flanges 31, 33, 35, and 37 have successively smaller diameters, as do the cylinders 39 between the flanges, as they approach the grommet neck, thereby creating a generally frustoconical outline. A preferred material for the grommet is a polyacrylic rubber of approximately 70 durometers.

A handle terminal block or adjustable stop 41 is secured to the insulative sheath 23 at the top end of the probe 6. The terminal block 41 may be fabricated from a glass-filled nylon material similar to the material of the band 9.

To seal the probe 6 of the present invention within the dip stick tube 7, the grommet flanges are cut off, starting with the end flange 31. As many flanges as necessary are cut off until the remaining end flange fits within and seals against the flared enlargement 47 of the upper end of the dip stick tube. In FIG. 1, it is assumed the flanges 31 and 33 have been cut off, leaving flange 35 as the end flange to seal against the dip stick tube flare 47. For additional sealing, the shoulder 49 of the grommet thick flange 27 seats against the tube top face 51. For dip stick tubes without a flared opening, all the grommet flanges are cut off such that the grommet neck 29 enters the tube, and sealing is accomplished entirely by the grommet shoulder 49 and the top face 51 of the tube.

To measure the level of the oil 3 in the engine 5, an electric wire 53 is threaded through the band 9. The preferred composition of the wire 53 is an iron-cobalt-nickel alloy having a diameter of approximately 0.031 mm. The electrical resistance of such a wire changes in a predictable manner with temperature change. Wire available under the Trademark "Therlo" is satisfactory. The wire passes through a first set of holes 55 that are located in the band at a location above the normal maximum oil level 21. The wires further pass through a second set of holes 57 that are located below the normal minimum oil level 11. Thus, the wire is formed into longitudinally extending loops that span the range of normal oil levels. The wire first end 59 is mechanically and electrically connected to the copper strip 17 by a solder connection 61. The wire second end 63 is connected to the copper strip 19 by a solder connection 65. To provide maximum oil flow around the wire, a window 67 is cut through the band for almost the full distance between the sets of holes 55 and 57, such that the wire loops span the window. To avoid puddling and a non-representative accumulation of oil or liquid at the bottom 70 of the window, a narrow slot 72 is provided with an enlargement 74. An extension 76 is also provided. The slot 72 and enlargement 74 afford draining and/or capillary withdrawal of fluid from the bottom 70. This affords a more rapid and positive sensing of true fluid level.

To electrically connect the probe 6 containing the wire 53 and copper strips 17, 19 to the circuit 8, a pair of cone point conductive screws 69 and 71 are employed. The screws 69 and 71 are threaded through the upper end of the mounting block 41 and through the insulative sheath 23 to contact the copper strips 17 and 19, respectively. Wires 73 and 75 are wrapped around the screws 69 and 71, respectively, and are captured by the respective screw heads. The wires 73 and 75 lead to the circuit 8, which is conventional in design.

The circuit 8 includes a first portion 77 that contains an integrated circuit LM1042, manufactured by National Semiconductor Corporation and called a Fluid Level Detector by the manufacturer. A second circuit portion 79 includes a BA656 monolithic integrated a signal level and display circuit, manufactured by Rohm Corporation. The circuit portion 79 includes a number of light emitting diodes 81, 83, 85, 87, and 89 which are turned on in correspondence with the measured liquid level. A calibrated volt meter, not shown, could be used to indicate the liquid level in correspondence with the output signal from detector 72.

In operation, the circuit portion 77 drives a steady state current through the probe wire 53, thereby causing the wire to heat up. If the wire is surrounded by air, ie., the wire is not immersed in the oil 3, the wire will heat up rapidly and cause the wire resistance to change by a relatively large amount. On the other end, if the wire is fully immersed in the oil, the oil will absorb the heat and keep the wire at approximately a constant temperature. Varying amounts of wire immersion in the oil produce corresponding changes in wire temperature and resistance. The LM1042 integrated circuit in circuit portion 77 measures the change in the voltage potential produced across the probe wire 53 as the resistance of the probe wire 53 changes with temperature.

The output from the first circuit portion 77 drives the second circuit portion 79, which contains the BA656 integrated circuit. Variations in the voltage received by the BA656 integrated circuit from circuit portion 77 results in different numbers of light emitting diodes 81, 83, 85, 87 and 89 to light. The fluid level detector 1 is calibrated such that the light emitting diode 81 lights at minimum voltage output from circuit portion 77, that is, when the oil 3 covers the maximum amount of the, wire 53. At maximum voltage output from circuit portion 77, ie., when the wire 53 is exposed primarily to air and not to oil, all the light emitting diodes light. For convenience, the light emitting diodes (LED) 81 and 83 may have green lenses, LED 85 may have a yellow lens, and LEDs 87 and 89 may have red lenses. In that way, a person operating the engine 5 is alerted visually to the quantity of oil within the engine.

EXAMPLE

A steady state current output of 200 milliamperes from the LM 1042 integrated circuit in circuit 77 will be assumed. A voltage of 1.8 volts is chosen as the wire voltage at normal operating conditions. The calculated wire resistance is then 10 ohms. For a wire diameter of 0.031 mm and a wire resistivity of 50 microohms centimeters, the wire length must be 9 cm. With a wire thermo conductivity of 0.147W cm °C., the voltage potential across the wire ranges from 1.8 volts with the wire completely submerged in oil to 2.4 volts with the wire completely removed from the oil. With an amplification gain of 10.4, an output of less than 2 volts from the LM 1042 integrated circuit causes only LED 81 to light. At 2 volts output, LEDs 81 and 83 light. With 3 volts output, LEDs 81, 83, and 85 light. At 4 volts output, LEDs 81, 83, 85, and 87 light, and at 5 volts output, all the LEDs light.

In practice, a wand length of 32 inches will be long enough to accomodate most automobiles. However, some 48 inch wands will be required for some RV's.

To calibrate the unit with an existing engine dip stick which is to be replaced, a calibration mark or indicia 90 (FIG. 2) can be provided. The existing dip stick add oil line is aligned side by side with line 90. The adjustable stop 41 is then shifted lengthwise on the wand as shown in FIG. 7 until the distance between the upper, not shown, on the conventional dip stick 96 and the oil fill line 98 thereon is the same as the distance between stop 41 and the fill line 90 on the wand.

A potentiometer, not shown, in the circuit is adjusted to provide a trigger point so that the red light emitting diode 89 will turn on when the oil level drops to the level of line 90 which corresponds to the lower permissible oil level which is marked 11 in FIG. 1.

Without further description, it is thought that the advantages and benefits to be gained from the disclosed embodiment of the fluid level detector of the present invention will be apparent to those skilled in the art. Furthermore, it is contemplated that various modification and alterations may be made to the fluid level detector of the present invention within the scope of the appended claims without departing from the spirit of the invention.

I claim:

1. A liquid level detector adapted to be inserted in the dip stick tube of an engine, comprising:
   an elongated flexible basically straight band of electrically nonconductive material having first and second ends,
   a predetermined length of thermoresisive wire formed into a plurality of loops secured to and extending lengthwise of the band nearer to said second end than to said first end, said wire having opposite terminal ends terminating along the band, said band having a window proximate to said second end over which window said loops of wire are arranged,
   conductors secured, respectively, to opposite sides of the band and extending from proximate to said first end of the band towards said second end nd terminating near said terminal ends of said wire, said terminal ends being electrically connected to said conductors, respectively,
   a sheath of electrical insulation encasing said band and said conductors thereon and having a second end terminating short of said loops of thermoresistive wire and a first end terminating proximate to said first end of the band,
   an electrically nonconductive element which serves as a handle into which said first ends of the sheath, of the conductors and of said band extend,
   screws in said handle for contacting said conductors, respectively, to serve as electrical terminals of said level detector, and
   a grommet formed over said sheath of insulating material adjacent the handle, the grommet having a plurality of axially spaced flanges of varying diameters.

2. An elongated liquid level detector for being inserted through the upper end of a dip stick tube of a reservoir for oil such as the crank case of an engine to facilitate determining the oil level in the reservoir, comprising:
   an elongated flexible basically straight flat band of electrically nonconductive material having opposite wide surfaces and narrower edge surfaces, said band having a nominally upper first end and a nominally lower second end,
   thin stripes of electrically conductive material bonded to each of said wide surfaces, respectively, and extending over a majority of the distance between said first and second ends and terminating short of said second end,
   a window in said band proximate to where said conductive strips terminate,
   means whose resistance varies with temperature disposed in said window, said means having terminals connected, respectively, to said strips of conductive material on opposite wide surfaces of said band, an electrically nonconductive member into which said first end of said band and the strips of conductive material thereon extend, said first end being severable to determine the length of said band, electric terminal elements for said detector retained in said member for contracting said conductive strips, respectively, and a sheath of insulating material encasing said band and conductive strips and extending from said nonconductive member to proximity with said lower ends of said conductive strips, and a grommet formed over the insulative sheath adjacent said nonconductive member constituting a handle, the grommet being formed with a plurality of axially spaced flanges of different diameters, the flanges being separated and connected by cylinders of different diameters.

3. In combination with a machine having an oil reservoir and a tube fastened to the machine and opening into the reservoir, apparatus for measuring the quantity of oil in the reservoir comprising:

a. a probe comprising:
   i. an elongated sheath of electrically insulative material having first and second ends and adapted to be inserted into said machine tube with the sheath first end protruding outside of the tube;
   ii. a handle formed over the sheath first end;
   iii. seal means formed over the sheath first end adjacent the handle for sealing the tube when the sheath is inserted into the tube, said seal means comprising a grommet formed with a plurality of axially spaced flanges of unequal diameter joined to and separated by cylindrical sections of unequal diameter to form a generally frusto-conical outline, the flanges and cylinders being selectively severable from the grommet to enable the grommet to be sealingly inserted into different sized machine tubes;
   iv. flexible wand means retained in the insulative sheath for extending into the reservoir fluid;
   v. a wire threaded through the wand means in the form of loops that are at least partially immersed in the reservoir oil, said wand having first and second sets of longitudinally spaced apart holes therethrough for threading the wire in the form of longitudinally loops, and said wand has a window between the first and second sets of holes such that the wire loops span the window to provide maximum oil circulation around the wires;
   vi. conductive mans for providing an electrical path from the wire to the handle; and b. circuit means connected to the probe handle for operating the probe to measure the quantity of oil in the reservoir.

4. The combination of claim 2 wherein the conductor means comprises:

a. a pair of elongated electrically conductive strips bonded to the wand means in electrical isolation from each other, the strips being in connection with the respective wire ends and extending within the insulative sheath to the first end thereof; and b. contact means retained in the handle and in electrical contact with the respective strips for connecting the conductive strips to the circuit means.

5. The combination of claim 3 wherein the wand means comprises an elongated wand of nonconductive material having a first end corresponding with the insulative sheath first end and a second end that extends beyond the sheath second end into the machine oil.

6. The combination of claim 5 wherein the conductor means comprises:

a. a pair of elongated conductive strips attached to the wand in electrical isolation from each other, the strips extending from the wand first end to adjacent the wire loops, a strip being electrically and mechanically joined to a respective wire end; and b. a pair of screws retained in the handle, each screw having one end in connection with a respective strip and the other end in electrical connection with the circuit means.

7. A dip stick for measuring liquid levels comprising a flexible wand comprised of insulating material having a rectangular cross section with longitudinally extending opposite flat sides having nominally upper and lower end portions, thin metallic layers constituting electrical leads bonded directly to said flat sides, respectively, and electrically insulated from each other, a resistive wire formed into loops extending along said wand proximate to said lower end portion with opposite ends of the wire electrically connected to said leads along the flat sides and an adjustable stop member having a through opening complementary in shape to said wand for said upper end portion of the wand to be adjustably received in said opening, and means for securing said stop member to said wand at an adjusted position relative to a reference mark on said wand positioned proximate to said wire in coincidence with a predesignated liquid level.

8. A dip stick for measuring liquid levels comprising a flexible wand having a rectangular cross section with longitudinally extending opposite flat sides, flat electrical leads adhered to said flat sides, respectively, and electrically insulated from each other, a resistive wire formed into loops extending along said wand with opposite ends of the wire electrically connected to said leads along the flat sides and an adjustable stop member having a through opening complementary in shape to said wand for said wand to be received in said opening, and means for securing said stop member to said wand at a selected position relative to a reference mark on said wand positioned proximate to said wire in correspondence with a predesignated liquid level, said means for securing said stop member comprising screws screwed into said stop member and aligned to said wand to contact said electrical leads and also secure the stop member, said screws constituting terminals for connecting to an electrical circuit.

* * * * *

UNITED STATES PATENT AND TRADEMARK OFFICE
CERTIFICATE OF CORRECTION

PATENT NO. : 4,988,975
DATED : January 29, 1991
INVENTOR(S) : Kimbel A. Nap

It is certified that error appears in the above—identified patent and that said Letters Patent is hereby corrected as shown below:

Column 6, Line 18:
    Delete "thermoresisive" and substitute
    --- thermoresistive ---.

Column 6, Line 28:
    Delete "towards" and substitute --- toward ---.

Column 6, Line 28:
    Delete "nd" and substitute --- and ---.

Column 7, Line 57:
    Delete "claim 2" and substitute --- claim 3 ---.

Signed and Sealed this

Twenty-third Day of June, 1992

Attest:

DOUGLAS B. COMER

*Attesting Officer*     *Acting Commissioner of Patents and Trademarks*